Feb. 18, 1958   A. O. CHAMPION   2,823,694
SAFETY VENT PLUG
Filed Nov. 25, 1955

Inventor
A.O. CHAMPION
By: Maybee & Legris
Att'ys

United States Patent Office 2,823,694
Patented Feb. 18, 1958

2,823,694

SAFETY VENT PLUG

Alexander Osmond Champion, Islington, Toronto, Ontario, Canada, assignor to Orenda Engines Limited, Malton, Ontario, Canada, a corporation Application November 25, 1955, Serial No. 548,951

2 Claims. (Cl. 137—197)

This invention relates to a safety device for insertion into a vent of an apparatus containing a combustible fluid from which the vent normally is shielded but which under adverse conditions might tend to escape through the vent. A device of the kind described is particularly useful in instruments of the kind which must be vented to atmosphere and through which a potentially dangerous fluid must flow. In such instruments if a fault develops the fluid might escape through the air vent thus causing a fire hazard.

An example of the type of instrument in question is a fuel pressure gauge which measures the difference between fuel pressure and atmospheric pressure. Instruments of this type usually include a diaphragm, one side of which is subject to the fuel pressure and the other side of which is at atmospheric pressure. The diaphragm deflects in response to the difference between the fuel pressure and the atmospheric pressure and this deflection is sensed by suitable means and is indicated on an appropriate dial calibrated in terms of pressure. Since one side of the diaphragm must always be at atmospheric pressure it follows that an air vent must be provided in the casing that encloses the diaphragm to permit the ingress and the exit of atmospheric air as the diaphragm deflects to varying extents because of the changes of fuel pressure. If the diaphragm should suddenly rupture there would be a sudden escape of fuel through the air vent. Even if the diaphragm should not rupture but should there be merely a fault in the instrument whereby a small amount of fuel seeps beyond the diaphragm the escaping fuel eventually would escape through the air vent. This escape of fuel in some applications could present a major fire hazard.

The device of the invention, which is for insertion in the vent, allows the ingress and exit of atmospheric air into and from the apparatus in which the device is installed. It should be emphasized that the device of the invention will prevent fuel from escaping through the vent not only if there should be a rupture of the diaphragm and a sudden attempted surge of fuel through the vent, but it will prevent the escape of fuel even if there is only a trivial leak of fuel in the apparatus with which the device is used.

Although the device is particularly described in its application to a fuel pressure gauge located in the combustion zone of a gas turbine engine, it will be apparent that the device has many other uses.

The construction, operation and advantages of the invention will become apparent from a study of the following specification, taken in conjunction with the accompanying drawings, in which like reference characters indicate corresponding parts throughout the several views, and in which.

Figure 4:
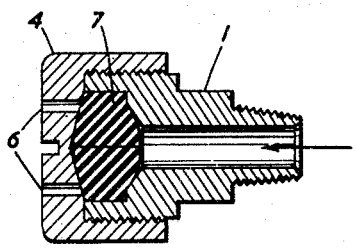
Figure 5:
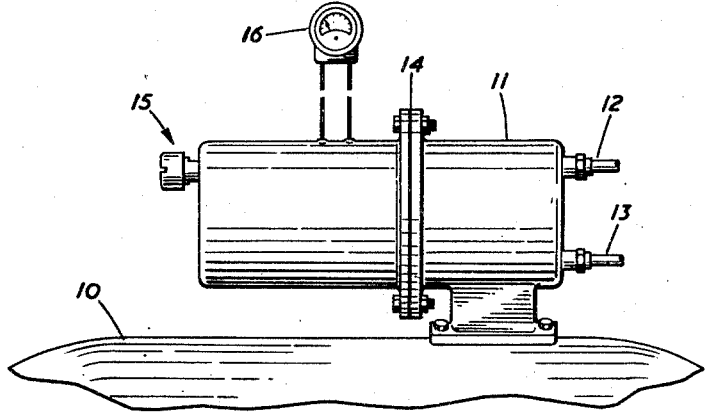

Fig. 4 is an axial cross-sectional view of the said device, illustrating particularly the condition of the partition after it has been subjected to a fuel leak for a few seconds; and Fig. 5 is fragmentary elevational view of a typical fuel pressure gauge installation on a combustion chamber of a gas turbine engine, and showing a device constructed in accordance with the invention installed thereon.

Referring to the drawings, the device comprises a body 1 having threads 2 at one end whereby the device may be inserted and screwed into the vent of the apparatus with which it is adapted to be used. At the other end of the body is a cavity generally indicated at 3, and fitted over the said other end is a hood 4. The hood provides a closure for the cavity and defines therewith a chamber having generally concave opposed end walls; the body and the hood together constitute a plug.

In the insertable end of the plug is an axial port 5 which extends through an end wall to the chamber. Another port, and preferably two ports 6, are provided in the hood 4 and extend from the other end wall of the chamber to atmosphere. Within the chamber is a resilient partition 7 which divides the chamber into a fore compartment which is in communication with the port 5 and an aft compartment which is in communication with the ports 6. The partition is of a thickness substantially equal to the depth of the peripheral wall of the chamber and it has a peripheral configuration complementary to the configuration of the peripheral wall so that at its periphery the partition is firmly held. It will be noted in the drawings that with the partition 7 in position in the chamber there is still some space 3a and 3b on each side of the partition. In the partition is an aperture 8 which preferably is axial and which is out of registration with the ports 6 of the hood 4.

The partition must be made of a material which swells when in contact with the liquid contained in the apparatus with which the device is intended to be used. The choice of materials for the partition obviously depends on many variables, including the type of fluid passing through the apparatus in the vent of which the safety device of the invention is installed. It can be generally stated, however, that the partition preferably should be made of a compound which swells rapidly to at least 125% its original size when exposed to the fluid, provided the compound does not disintegrate entirely. If the fluid passing through the apparatus in which the device is installed is gasoline, or kerosene, or an aromatic fuel, or a low aniline point petroleum base fluid, the partition may be made of natural rubber, latex rubber, or silicone rubber, in either solid or sponge form. If the ambient temperature where the device is installed is relatively high, say of the order of 300° F., the partition should be made of silicone rubber; other rubbers will deteriorate at such temperatures.

In Figure 5 is illustrated a gas turbine engine combustion chamber 10 on which is mounted a diaphragm type fuel pressure gauge 11. The fuel enters and leaves the gauge through inlet line 12 and outlet line 13 respectively. Within the gauge and held at the flanges 14 is a flexible diaphragm (not shown). The difference between the pressure of the fuel and atmospheric pressure causes a deflection of the diaphragm, which deflection is indicated on an indicating dial 16 in a well known manner. Since one side (the left hand side, as shown in the drawings) of the diaphragm must be at atmospheric pressure it follows that an air vent must be provided in the apparatus 11 so that the apparatus may "breathe." However, should the diaphragm rupture or should there be a fault in the apparatus whereby some fuel leaks into the "atmospheric portion" of the apparatus the leakage eventually would escape through the air vent and create a serious fire hazard. To avoid this condition, the device of the invention is inserted into the air vent, as illustrated at 15.

Figure 1:
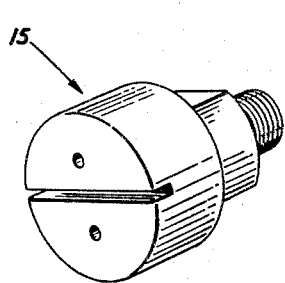
Fig. 1 is a perspective view of a safety device constructed in accordance with the invention.
Figure 2:
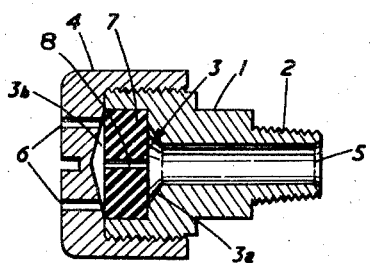
Fig. 2 is an axial cross-sectional view of the said device, in which the resilient partition is shown in its normal position when the device is in use and atmospheric air is being vented therethrough.
Figure 3:
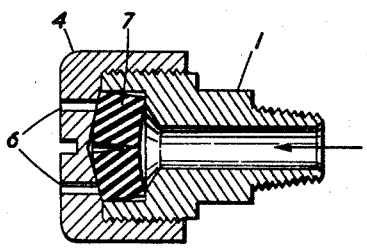
Fig. 3 is an axial cross-sectional view of the said device, illustrating particularly the condition of the resilient partition when subjected to a sudden surge of fuel.

In normal operation, air is vented through the device by passing through the hood ports 6, the aperture 8, and the port 5. Should there be a sudden surge of fuel towards the air vent the partition would deflect as shown in Figure 3 and the passages 6 would be sealed by the partition which bears against them while the aperture 8 would be sealed by the end wall of the hood 4 which bears against it. On the other hand, if there should be a slow seepage of fuel towards the air vent, the fuel would immediately attack the partititon material and cause it to swell sufficiently to close the aperture 8 within a few seconds, as illustrated in Figure 4. Not only would the aperture in the partition be sealed due to swelling, but within a short time the entire partition would swell sufficiently to fill the entire cavity and completely close off the vent.

In a typical device construction in accordance with the invention the partition is ⅝" in diameter and ¼" thick, and the aperture in it is 1/32" in diameter. It is made of silicone rubber having a durometer hardness of 30. It has been used successfully in the combustion chamber region of a gas turbine engine where the ambient temperature is 350° F. It will deflect and seal suddenly on a surge of fuel if the pressure is above 15 lbs. per sq. inch, which pressure of course is negligible. When subjected to a mere fuel seepage the partition has been found to swell and to seal the aperture completely in 16 seconds. Tests under simulated conditions of fuel seepage and of fuel surge towards the vent have demonstrated that no fuel will escape through a vent in which the device of the invention has been installed.

What I claim as my invention is:

1. A safety device for an air vent of an apparatus contaiing a combustible fluid from which the vent normally is shielded but which under adverse conditions might tend to escape through the vent, comprising a plug having an insertable end for insertion in the vent and having a free end, a chamber within the plug, the chamber being defined by a peripheral wall and by two opposed end walls, a first port through the insertable end of the plug and extending to the chamber through an end wall, a second port in the free end of the plug extending from the other end wall of the chamber to atmosphere, a resilient partition dividing the chamber into a fore compartment which is in communication with the first port and an aft compartment which is in communication with the second port, an aperture in the partition interconnecting the two compartments, the aperture being out of registration with the second port, the partition deflecting and bearing against the aforesaid other end wall when the partition is subjected to a sudden surge of the combustible fluid contained in the apparatus with which the device is used so that the aperture and the second port are sealed from each other and combustible fluid thus is prevented from escaping to atmosphere, the partition being made of a material which swells when contacted by the said fluid so that the partition swells and seals the aperture when it is contacted by a mere seepage of the said fluid.

2. A safety device for an air vent of an apparatus containing a combustible fluid from which the vent normally is shielded but which under adverse conditions might tend to escape through the vent, comprising a pluging an insertable end for insertion in the vent and having a free end, a chamber within the plug, the chamber being defined by a peripheral wall and by two opposed generally concave end walls, a first port through the insertable end of the plug and extending to the chamber through an end wall, second port in the free end of the plug extending from the other end wall of the chamber to atmosphere, a resilient partition dividing the chamber into a fore compartment which is in communication with the first port and an aft compartment which is in communication with the second port, the partition being of a thickness substantially equal to the depth of the peripheral wall and having a peripheral configuration complementary to the configuration of the peripheral wall so that at its periphery the partition is held firmly by the chamber walls, an aperture in the partition interconnecting the two compartments, the aperture being out of registration with the second port, the partition deflecting and bearing against the aforesaid other end wall when the partition is subjected to a sudden surge of the combutsible fluid contained in the apparatus with which the device is used so that the aperture and the second port are sealed from each other and combustible fluid thus is prevented from the escaping to atmosphere, the partition being made of a material which swells when contacted by the said fluid so that the partition swells and seals the aperture when it is contacted by a mere seepage of the said fluid.

References Cited in the file of this patent

UNITED STATES PATENTS

| 1,398,764 | Blum | Nov. 29, 1921 |
| 2,331,431 | Simoneau | Oct. 12, 1943 |
| 2,601,216 | White et al. | June 17, 1952 |
| 2,672,878 | Hencken | Mar. 23, 1954 |

FOREIGN PATENTS

| 517,966 | Canada | Nov. 1, 1955 |